Feb. 12, 1946. W. R. BLOMGREN 2,394,890
UNIVERSAL JOINT
Filed Jan. 30, 1943
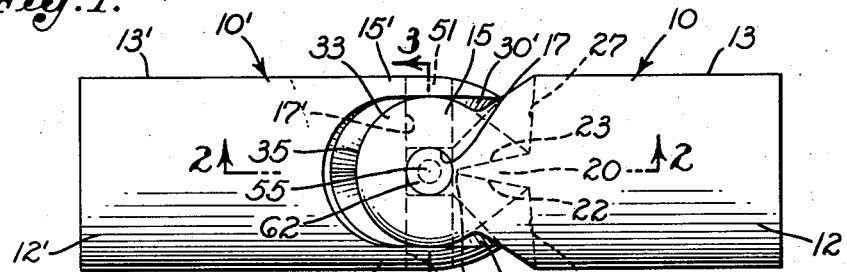
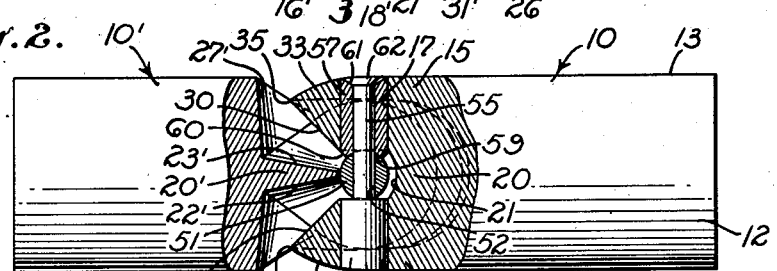
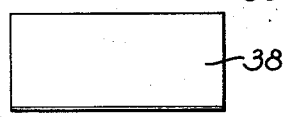
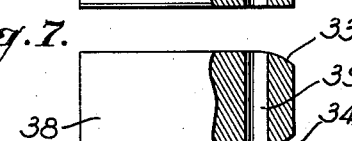
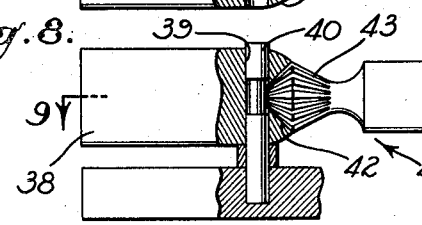
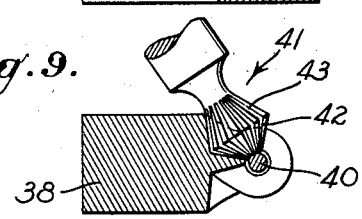
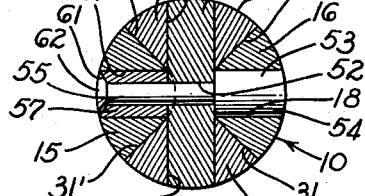
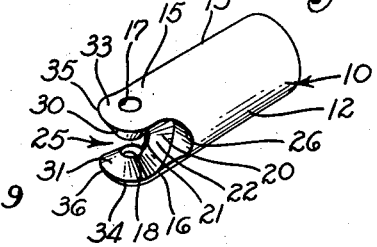
INVENTOR
WALTER R. BLOMGREN
BY
HARRIS, KIECH, FOSTER & HARRIS
Clarence F. Kiech
FOR THE FIRM
ATTORNEYS.

Patented Feb. 12, 1946

2,394,890

UNITED STATES PATENT OFFICE 2,394,890

UNIVERSAL JOINT

Walter R. Blomgren, Los Angeles, Calif., assignor to M. Aron, Sol Aron, and Walter R. Blomgren, copartners doing business as Pacific Machine Works, Los Angeles, Calif.

Application January 30, 1943, Serial No. 474,157

1 Claim. (Cl. 64—9)

My invention relates to a universal joint and, more particularly, to a novel universal joint of the type in which torque is transmitted directly from one element to another without the necessity of intervening torque-transmitting means.

Generally speaking, the invention includes two universal joint elements, each providing a body portion and two arm portions extending forward therefrom. The inner surfaces of the arm portions are in the form of truncated cones or frustoconical sections, each having a surface angle of substantially 90°. Two such universal joint elements can be telescoped together so that the cones of one lie between the cones of the other and are in engagement therewith. Torque can be transmitted directly from one element to the other through the surface engagement of the cones, and this is true even though the longitudinal axes of the elements are disposed out of alignment. The elements are retained in proper engaging relationship by a cross-pin means providing radially disposed pins extending into bores of the corresponding cones.

It is an object of the present invention to provide a universal joint of this type which is of increased strength and which is well adapted to quantity production.

Another object of the invention is to provide such a universal joint composed of two elements which can be produced cheaply and with a minimum of machine operations.

The invention also includes among its objects the provision of a universal joint in which both elements are identical. These elements in themselves are novel and form a part of the present invention, as does also the novel method of making such elements.

Other objects of the invention lie in the provision of a novel cross-pin means for such a universal joint which facilitates both assembly and interconnection of the two elements.

Further objects and advantages of the invention will be evident to those skilled in the art from the following description of an exemplary embodiment of the invention.

Referring to the drawing:

Figure 1 is a top elevational view of the universal joint;

Figure 2 is a vertical sectional view, taken as indicated by the line 2—2 of Figure 1;

Figure 3 is a cross-sectional view, taken along the line 3—3 of Figure 1;

Figure 4 is a perspective view of a universal joint element of the invention;

Figures 5 to 8, inclusive, represent sequentially the steps employed in the preferred method of making a universal joint element; and Figure 9 is a view taken generally as indicated by the line 9—9 of Figure 8, with the cutter shown in one extreme position.

The invention employs two of the universal joint elements shown in Figure 4, these being generally indicated by the numerals 10 and 10' of Figures 1 to 3. Hereinafter, element 10 will be specifically described, as the element 10' is a duplicate thereof, and corresponding parts on the element 10' will be indicated by primed numerals.

The element 10 includes a body portion 12 providing a cylindrical surface 13 and suitable means, not shown, for connection to one of the two shafts which are to be interconnected by the universal joint. Integral with, and extending forward from, the body portion 12 are two arm portions 15 and 16 spaced from each other, these arm portions being respectively drilled to provide aligned bores 17 and 18 that open on the space between the arms.

A web 20 extends between, and is formed integrally with, the arm portions 15 and 16. This web 20 extends forward from, and is also integral with, the body portion 12 and provides a forward edge 21 disposed adjacent the aligned bores 17 and 18. This web 20 provides side surfaces 22 and 23 which preferably diverge in a rearward direction to provide a web which tapers forwardly. Furthermore, the thickness of the web 20 increases toward the junction thereof with the arm portions 15 and 16, as will be made clear upon later reference to the method of making the universal joint element 10.

The space between the arm portions 15 and 16 comprises an arcuate cavity 25 which extends completely around the aligned axes of the bores 17 and 18 except for the space occupied by the web 20. One end of this arcuate cavity 25 is bounded by the side surface 22 of the web 20 and by a rear surface 26, while the other end of this arcuate cavity is bounded by the side surface 23 of the web 20 and by a rear surface 27. The rear surfaces 26 and 27 angularly meet the side surfaces 22 and 23 of the web 20 to provide, in effect, pockets which receive the extremities of the arm portions 15' and 16' of the other universal joint element 10' when these elements are disposed out of axial alignment with each other. As will be apparent from the later description, the rear surfaces 26 and 27 extend outward to the cylindrical periphery of the body portion 10, being formed as smooth, uninterrupted, curved surfaces. It will be noted that the pockets at the ends of the arcuate cavity 25 open outward on the cylindrical surface 13, without obstruction at or near this cylindrical surface.

The arcuate cavity 25 is also bounded by the inner surfaces of the arm portions 15 and 16. These inner surfaces of the arm portions are provided by truncated cones 30 and 31 so that each of these inner surfaces is in the shape of a frusto-conical section. Preferably, the apex angle of these truncated cones is substantially 90°, so that the truncated cones of the element 10 can be telescoped or intermeshed with the corresponding truncated cones 30' and 31' of the element 10' to form an interlocking structure, suggested in Figure 3. If the apex angle of each truncated cone is substantially 90°, these cones will be in line contact at the section 3—3, as illustraed in Figure 3. Usually, only sufficient play is provided to permit change in the angular relationship between the elements 10 and 10', without producing binding. In this manner, angular play between the elements 10 and 10' can be minimized, while still providing a free-acting universal joint.

The surfaces of the arm portions 15 and 16 represent smooth continuations of the cylindrical surface 13. This is one important feature of the invention as it very substantially increases the strength of the arm portions. Any indentation in this surface at the junction of the arm portions and the body portion tends substantially to weaken the universal joint. At the same time, if the external surfaces of the arm portions 15 and 16 are smooth continuations of the cylindrical surface 13, the element 10 can be formed of bar stock and all machine operations, such as would be required to form indentations, are eliminated.

The common axis of the aligned bores 17 and 18 intersects transversely the longitudinal axis of the element 10. These bores are of the same diameter, both in the elements 10 and 10'. Such bores intersect the truncated cones 30 and 31 at a relatively sharp edge, though this edge can be rounded off slightly without substantially decreasing the torsional strength of the universal joint.

The extreme forward ends of the arm portions 15 and 16 are preferably curved inward toward the longitudinal axis of the element 10 to provide curved surfaces 33 and 34, as best shown in Figures 2 and 4. The curve of the surface 33, for example, is preferably such as to intersect the truncated cone 30 at its base in a plane substantially parallel to the longitudinal axis and to provide a forward periphery 35 of the arm portion 15 which is substantially concentric with the axis of the bore 17, when viewed as in Figure 1, through an angular distance greater than 180° and preferably in the neighborhood of about 240°–260°. A corresponding forward periphery 36 is provided by the arm portion 16. When the universal joint is flexed in maximum degree, the forward periphery 35, for example, extends substantially to the line of obtuse intersection of the side surface 23' and the rear surface 27', as can best be determined from Figure 2. At the same time, the curved surface 34 of the arm portion 16, which now tends to protrude from its corresponding pocket of the cylindrical cavity 25, prevents any such degree of extension of this arm portion as might represent a hazard if the universal joint is rotating. The curved surfaces 33 and 34 are also important in permitting the relatively large degree of angular displacement permissible with the universal joint of the invention, while still permitting the use of a web 20 of sufficient thickness to serve as a substantial reinforcement for the arm portions 15 and 16. It should be understood, however, that the curved surfaces 33 and 34 could be eliminated, if desired, without departing from the spirit of the invention, in which event the arm portions 15 and 16 will present external surfaces of a cylindrical nature which extend to the forward periphery 35 and 36.

The exact nature of the contours of the walls bounding the arcuate cavity 25 can be understood even better by a description of the method of making these elements. As suggested in Figure 5, the first step is to cut a bar of cylindrical stock 38 to the desired length. Thereafter, a transverse bore 39 is drilled therein, as suggested in Figure 6. The ends of this bore 39 ultimately form the bores 17 and 18 previously mentioned. If curved surfaces 33 and 34 are desired, the next step, suggested in Figure 7, is to form these surfaces. For example, the stock 38 can be placed in a lathe and the end diameter reduced progressively as suggested in Figure 7.

The final step involved is the cutting of the arcuate cavity 25. This may be accomplished by pivotally mounting the stock 38 on a stationary arbor 40, extending into the bore 39 and mounted in a suitable base plate or jig. A double-conical milling cutter 41 is employed for the cutting operation. As best shown in Figures 8 and 9, it includes a forward conical cutting portion 42 and a rearward conical cutting portion 43 formed base-to-base as a part of the cutter 41. The apex angle of the forward conical cutting portion 42 is substantially 90°, though the apex angle of the rearward conical cutting portion 43 is usually less than 90°. With the stock 38 mounted on the arbor 40, the rotating cutter 41 is advanced toward the stock, or vice versa, to produce the type of cut suggested in Figure 8. Thereafter, the stock 38 can be slowly pivoted about the arbor 40, first in one direction and then in the other to produce the arcuate cavity 25. Alternatively, it should be understood that the stock 38 can be fixed to the arbor 40 and the cutter 41 revolved about the axis of the arbor to produce the arcuate cavity 25. In either instance, there will be a relative revolution of the cutter through an arc about the axis of the bore 39, whether the cutter itself be revolved with respect to the stock or the stock turned with respect to the cutter, it being the relative revolution of the stock and the cutter that produces the arcuate cavity.

It will be understood that, as the cutter 41 advances toward its one extreme relative position suggested in Figure 9, the forward conical portion 42 produces simultaneously one side portion of each of the truncated cones 30 and 31. However, during movement to this extreme position, the rear conical cutting portion 43 also comes into play to cooperate with the forward portion in forming the pocket at the end of the arcuate cavity 25. The curves of the side surface 22 of the web 20 and of the rear surface 26, for example, are thus simultaneously determined by the cutting action of the teeth of the cutter 41. The peripheral length of the rear conical cutting portion 43 is sufficient to extend completely to the cylindrical surface of the stock. By relative motion of the stock 38 and the cutter 41 to the extreme position, the opposite pocket will be formed. These operations automatically form the web 20.

In assembling two of the universal joint elements, it is necessary to provide a pivot means for retaining the truncated cones in proper relationship. This pivot means is shown generally in Figures 1, 2, and 3 as comprising a cross-shaped pin means providing, in effect, four radially extending pins which extend respectively into the aligned bores 17, 17', 18, 18' of the four arm portions 15, 15', 16, 16'. The preferred construction of this cross-shaped pin means is best shown in Figures 2 and 3. A first pin, 51, of cylindrical shape, is disposed to extend through the aligned bores 17' and 18', being of a diameter only slightly smaller than the bores so as to be pivotable therein. This first pin 51 provides a transverse bore 52 in the space between the truncated cones 30 and 31. A second pin 53 provides a head 54 and a reduced-diameter shank 55, the latter extending through the transverse bore 52. The head 54 is of a diameter to pivot in the bore 18, while the end of the shank 55 extends through the aligned bore 17. A sleeve 57 surrounds the shank 55 and is of such diameter as to pivot within the bore 17.

Means is preferably provided for preventing turning of the sleeve 57 with respect to the shank 55. Most conveniently, this can be done by curving the inner end of the sleeve 57 so that it corresponds in curvature to, and partially envelops, the periphery of the first pin 51, as suggested in Figure 2 where the curved surface of the sleeve is indicated by the numeral 59. To avoid any interference between the inner end of the sleeve and the webs 20 and 20' upon maximum flexure of the universal joint, this inner end of the sleeve is preferably beveled, as indicated by the numeral 60, to form a continuation of the frusto-conical surface of the adjacent truncated cone. Also, the sleeve 57 should be maintained in contact with the pin 51 and this can be accomplished by providing an obstruction on the end of the shank 55 engaging the sleeve 57. For example, the outer end of this sleeve may be countersunk, as indicated by the numeral 61 and the outer end of the shank 55 can be deformed by peening to spread in the counter-bore and provide a head 62. This operation is the only one required to lock all elements of the universal joint together. Preferably, the heads 54 and 62, and the ends of the pin 51, are substantially flush with the surfaces of their respective arm portions.

It will be apparent that this type of universal joint can be rapidly manufactured with a minimum of parts. At the same time, it requires only a very simple operation to assemble the elements making up the universal joint. The resulting universal joint is very strong in tension or torsion. With regard to the torsional strength, it will be apparent that transmission of torque is effected by actual engagement of the truncated cones and that the cross-pin means carries substantially none of this torque, serving primarily to hold the universal joint elements in proper relationship and to determine the proper pivoting relationship therebetween.

Various changes can be made without departing from the spirit of the invention as defined in the appended claim.

I claim as my invention:

A universal joint including a cooperating pair of joint elements, each including a body portion having a cylindrical surface, a pair of arms integral with each body portion and extending axially forward thereof, said arms being formed with bores which are disposed in axial alignment with each other and each arm providing an external surface which is a smooth unnotched continuation of said cylindrical surface from said body portion substantially to the bore of the arm, a web extending between said arms and formed integrally therewith, the space between said arms comprising an arcuate cavity, opposed frustoconical surfaces formed on the inner ends of said arms coaxially of said bores and bounding said arcuate cavity on the opposite sides of said web, and pins extending through said aligned bores for connecting said elements for universal movement, each end of said arcuate cavity comprising a surface of said web and an arcuate end wall extending outwardly therefrom at an angle sufficient to provide a flaring passage open to the juncture of the web and end wall in any angular relation to the joint elements.

WALTER R. BLOMGREN.